US007293109B2

(12) United States Patent
Ott et al.

(10) Patent No.: US 7,293,109 B2
(45) Date of Patent: *Nov. 6, 2007

(54) DYNAMIC CONTENT BASED MULTICAST ROUTING IN MOBILE NETWORKS

(75) Inventors: Maximilian Ott, Pennington, NJ (US); Daniel J. Reininger, Princeton, NJ (US); Leslie French, Princeton, NJ (US); Dipankar Raychaudhuri, Princeton, NJ (US)

(73) Assignee: Semandex Networks, Inc., Princeton, NJ (US)

( * ) Notice: Subject to any disclaimer, the term of this patent is extended or adjusted under 35 U.S.C. 154(b) by 616 days.

This patent is subject to a terminal disclaimer.

(21) Appl. No.: 10/271,502

(22) Filed: Oct. 15, 2002

(65) Prior Publication Data

US 2003/0120817 A1 Jun. 26, 2003

Related U.S. Application Data

(60) Provisional application No. 60/329,485, filed on Oct. 15, 2001.

(51) Int. Cl.
*G06F 15/16* (2006.01)
*G06F 15/173* (2006.01)

(52) U.S. Cl. ........................... 709/249; 709/238
(58) Field of Classification Search ................ 709/218, 709/219, 242, 249
See application file for complete search history.

(56) References Cited

U.S. PATENT DOCUMENTS 5,974,417 A    10/1999    Bracho et al.

(Continued)

FOREIGN PATENT DOCUMENTS

CN    1299488 A    6/2001

(Continued)

OTHER PUBLICATIONS

Ott et al. "The JOURNEY Active Network Model" *IEE JSAC*, vol. 19, No. 3, pp. 527-537 Mar. 2001.

(Continued)

*Primary Examiner*—Jason Cardone
*Assistant Examiner*—Minh-Chau Nguyen
(74) *Attorney, Agent, or Firm*—Wilmer Cutler Pickering Hale and Dorr LLP

(57) ABSTRACT

The present invention changes the wireless information service paradigm from a connection-oriented unicast network model to a dynamic content-driven multicast model using a technique called "content routing." The present invention provides a system, method, and medium for routing content through a network from at least one content provider to at least one content consumer, wherein at least one of the content consumer or content provider communicate with the network using a wireless device. The content is routed though the network based on its content. The content is labeled with at least one content descriptor. The content descriptor characterizes or otherwise describes the content. Interest profiles are received from content consumers. Interest profiles from content consumers with a common network access point are aggregated into a single interest profile. Interest profiles can include more than the wireless consumers stated interest, such as for example, a content consumer's geographic location, the capabilities of the wireless terminal, type of service, policy preferences, and the like. Single interest profiles are shared across neighboring network access points to create a content routing table. Content, labeled with at least one descriptor, is routed through the network to content consumers based, in part, on content routing tables created from wireless content consumers' profiles.

29 Claims, 8 Drawing Sheets

U.S. PATENT DOCUMENTS

| | | | |
|---|---|---|---|
| 6,029,195 | A | 2/2000 | Herz .......................... 709/219 |
| 6,055,364 | A | 4/2000 | Speakman et al. |
| 6,154,745 | A | 11/2000 | Kari et al. .................. 707/100 |
| 6,324,584 | B1* | 11/2001 | Mandalia .................... 709/238 |
| 6,374,290 | B1* | 4/2002 | Scharber et al. ............ 709/205 |
| 6,421,675 | B1 | 7/2002 | Ryan et al. .................. 707/100 |
| 6,498,795 | B1* | 12/2002 | Zhang et al. ................ 370/400 |
| 6,632,251 | B1 | 10/2003 | Rutten et al. |
| 6,701,362 | B1* | 3/2004 | Subramonian et al. ...... 709/224 |
| 6,922,567 | B1* | 7/2005 | Rydbeck .................. 455/456.3 |
| 2002/0004844 | A1* | 1/2002 | Harari et al. ............... 709/238 |
| 2002/0022453 | A1* | 2/2002 | Balog et al. .................. 455/41 |
| 2002/0049727 | A1* | 4/2002 | Rothkopf ........................ 707/1 |
| 2002/0062300 | A1 | 5/2002 | Asadov et al. |
| 2002/0091736 | A1* | 7/2002 | Wall ........................... 707/513 |
| 2002/0150093 | A1* | 10/2002 | Ott et al. .................... 370/389 |
| 2002/0174050 | A1* | 11/2002 | Eynard et al. ................ 705/37 |
| 2004/0042596 | A1 | 3/2004 | Kim et al. |
| 2004/0098449 | A1 | 5/2004 | Brancho et al. |
| 2004/0153545 | A1 | 8/2004 | Pandya et al. |

FOREIGN PATENT DOCUMENTS

| | | |
|---|---|---|
| GB | 2341700 | 3/2000 |

OTHER PUBLICATIONS

Devanbu, P.; Stubblebine, S.; Uschold, M. 2000. "The Next Revolution: Free, Full, Open Person-2-Person (P2P) E-commerce." Workshop on Internet-scale software Technology University of California, Irvine, California, Jul. 3, 2000.

Segall B.; Arnold D. 1997, "Elvin has left the building: A publish/subscribe notification service with quenching." Austrian Unix Users Group Annual Conference pp. 243-255.

Aguilera, M.; Strom, r.; Sturman, D.; Astley, M.; Chandra, T. 1999, Matching Events in a Content-based Subscription System:, Proceeding of Principles of Distributed Computing, Atlanta, GA, May 1999.

Banavar, G.; Kaplan, M.; Shaw, K.; Strom, R.; Sturman, D.; Tao, T. 1999, "Information Flow Based Event Distributin Middleware", Middleware Workshop at International Conference on Distributed Computing Systems.

Ives, Z.; Levy, A.; Weid, D. 2000, Efficient Evaluation of Regular Path Expressions on Streaming XML Data: Technical Report UW-CSE-2000-05-02, University of Washington Department of Computer Science and Engineering.

Carzaniga, A.; Rosenblum, D.; Wolf, A, 2000, "Content-Based Addressing and Routing: A General Model and Its Application" technical Report CU-CS-902-00, Department of Computer Science University of Colorado at Boulder, Jan. 2000.

Sheldon, M., 1995 "Content Routing: A Scalable Architecture for Network-Based Information Discovery", Ph.D. Thesis, MIT.

Banavar, G.; Chandra, T.; Mekherjee, B.; Nagarajarao, J.; Strom, R.; Stuman, D. 1999. "An Efficient Multicase Protocol for Content-Based Publish-Subscrube Systems" International Conference on Distributed Computing Systems.

Sturtevant, N.; Tang, M.; Zhang, L. 1999, "The Information Discovery Graph: Towards a Scalable Multimedia Resource Directory", Proceedings of IEEE Workshop on Internet Applications (WIAPP) San Jose, California, Jul. 1999.

Opyrchal, L.; Astley, M.; Auerbach, J.; Banavar, G.; Strom, R.; Sturman, D. 2000, "Exploiting IP mUlticast in Content-Based Publish-Subscribe Systems" Proceedings of Middleware.

Aguilera, M.; Strom, R.; Sturman, D.; Astley, M.; Chandra, T. 1999 Matching Events in a Content-Based Subscription Systems:, Principles of Distributed Computing.

Dao, S.; Perry, B.; Shek, E.; Vellaikal, A.; Muntz, R.; Zhang, L.; Potkonjak, M.; Wolfson, O. 1999. "Semantic Multicast: Intelligently Sharing Collaborative Sessions" ACM Computing Surveys.

Sheldon, M.; Duda, A.; Weiss, R.; O'Toole, J.; Gifford, D. 1994. "Content Routing for Distributed Information Servers" Proceedings of Fourth International Conference on Extending Databse Technology, Cambridge, England, Mar. 1994.

Duda, A.; Sheldon, M. 1994. "Content Routing in a Network of WAIS Servers" 14th IEEE International Conference on Distributed Computing Systems. Poland, Jun. 1994.

Dao, S.; Perry, B. 1996 "Information Dissemination in Hybrid Satellite/Terrestrial" Data Engineering Bulletin, 19(3):12-18, Sep. 1996.

Carzaniga, A. Wolf, A. 2001 "Design and Evaluation of a Wide-Area Event Notification Service" ACM Transactions on Computer systems (19(3): 332-383, Aug. 2001.

* cited by examiner

| | |
|---|---|
| 105 | Document |
| 110 | Content Descriptor |
| 115 | Sending into the network |
| 120 | Semantic Packet |
| 125 | Interest Profile |
| 130 | Sending I.P. into the network |
| 135 | Receiving Content |
| 140 | The Network |
| 145 | Semantic MultiCast Router (SMR) |

DYNAMIC CONTENT BASED MULTICAST ROUTING IN MOBILE NETWORKS

Priority is herewith claimed under 35 U.S.C. § 119(e) from copending Provisional Patent Application No. 60/329,485 filed Oct. 15, 2001, and is incorporated by reference herein in its entirety.

FIELD OF THE INVENTION

The present invention relates to a system and a method for providing scalable and efficient information services to users of wireless devices. More particularly, the present invention relates to a dynamic content driven multicast system and method for users of mobile devices whereby information is routed through the system based on the content.

BACKGROUND

While there has been a great deal of work on supporting terminal mobility at the network layer (e.g., mobile Internet Protocol (IP), mobile Asynchronous Transfer Mode (ATM), 3GPP (Third Generation Partnership Project)), the resulting point-to-point connectivity solutions in conjunction with existing Internet service models (e.g., Transmission Control Protocol/Internet Protocol (TCP/IP), Hypertext Transfer Protocol (http), search engines, web portals, etc.) do not adequately address the more fundamental issue of providing scalable and efficient information services to mobile users. Information delivery to mobile users is inherently different from conventional web services because of several factors.

One, mobile users need relevant real-time information independent of where the data reside (rather than point-to-point communication with a given network address). In many applications, communication between the mobile user and other network users will be based on "information affinity" without prior knowledge of the physical address of the communicating parties.

Two, information latency is of particular importance in the mobile computing context, since many of the envisaged applications are embedded into daily life activities. The system must be capable of delivering the desired information within seconds, in contrast to the scenario of web browsing from a wired network device, where more latency can be tolerated.

Three, user context is of particular significance in mobile applications. Factors that affect the specifics of the network service delivered include subscriber location, usage mode, other open applications, terminal capabilities, available link bandwidth and cost, etc.

Four, wireless devices will periodically change their physical point of attachment to the network. This means that the network must support the capability of dynamically re-establishing connectivity via a new access point, without losing session or application level services due to timeout mechanisms, change in service gateway, etc.

Five, mobile or wireless applications may include highly proliferated scenarios (such as sensor arrays or even home networks with many devices) in which the information model involves flexible matching of providers and consumers (rather than point-to-point connectivity). In this case, assignment of global IP addresses and the use of traditional service discovery protocols to reach each wireless device may be undesirable, or infeasible, due to scalability and complexity considerations, motivating the need for an alternative network service model.

The first generation of mobile information services are based on adaptations of familiar web technologies being accessed through a wireless packet data link such as Cellular Digital Packet Data (CDPD), General Packet Radio Service (GPRS) or 802.11b. (802.11 refers to a family of specifications developed by the IEEE for wireless local area network (LAN) technology. 802.11b is an extension to 802.11 that applies to wireless LANs and provides 11 Mbps transmission (with a fallback to 5.5, 2 and 1 Mbps) in the 2.4 GHz band.) In some cases, proprietary gateway protocols (such as Wireless Application Protocol (WAP)) have been devised as a means for adapting conventional web services to the bandwidth-limited wireless channel. See for example, the WAP 2.0 technical specifications, available from the WAP Forum at www.wapforum.org. The resulting services have received limited market acceptance due to performance or usage limitations caused by one or more of the factors mentioned above. The basic problem is that of trying to use available point-to-point network services (e.g., http, TCP/IP) to provide real-time, location-dependent information adapted to the capabilities of mobile terminals. User feedback indicates that the familiar web browsing model used in the wired Internet is not appropriate for mobile devices intended to facilitate daily life activities in real-time. Serious performance problems (such as frequent session timeouts) have been reported with centralized processing gateways and mobile service portals accessed via conventional point-to-point protocols like TCP/IP.

Multicasting-based "publish-subscribe" information service models have long been recognized as a potential solution to some of the above problems, since this approach avoids the inefficiencies of providing an inherently distributed and multipoint information retrieval solution on a point-to-point network service. IP multicast has been proposed as a means for efficient multicasting over the Internet, and represents an important step towards solving the mobile information service problem. However, while IP multicast addresses the issue of efficient multicast routing, it still leaves open the more important issue of how information is mapped onto logical multicast "channels". There are commercial solutions which use multicasting (e.g., Tibco™ Software, Inc. 3165 Porter Drive, Palo Alto, Calif. 94304), but the critical process of mapping information onto a linear list of multicast channels remains a basic scalability bottleneck. While IP multicast solves an important part of the problem, its value is fundamentally limited by the fact that end users must have prior knowledge of the semantics associated with each multicast channel. Because of the one-dimensional nature of the multicast channels, this semantic mapping is often coarse and requires additional filtering in the receiver to reduce the information to what the application needs. This approach requires complex, application specific logic to map information to channels. It is also potentially wasteful of network and the terminal CPU resources, which is a significant issue for wireless networks and battery powered mobile devices.

SUMMARY OF THE INVENTION

As the "mobile Internet" vision articulated during the past decade becomes a reality, there is a growing need for more scalable and efficient mobile infrastructure networks. The present invention changes the mobile information service paradigm from a connection-oriented unicast network model to a dynamic content-driven multicast model using a technique called "content routing". According to one embodiment of the present invention, this is done by overlaying a content routing middleware framework on top of existing network layers to provide a so-called "semantic socket" layer service as an interface for development of a new class of mobile applications. Deploying the method of the present invention as an overlay onto an existing, deployed technology allows for a quick and staged roll-out. Alternatively, a more integrated solution consists of a dual-stack router where IP routing and semantic routing co-exist. Conceptually however, content routing is at the same level as IP routing.

DETAILED DESCRIPTION OF THE EXEMPLARY EMBODIMENT

Figure 1:
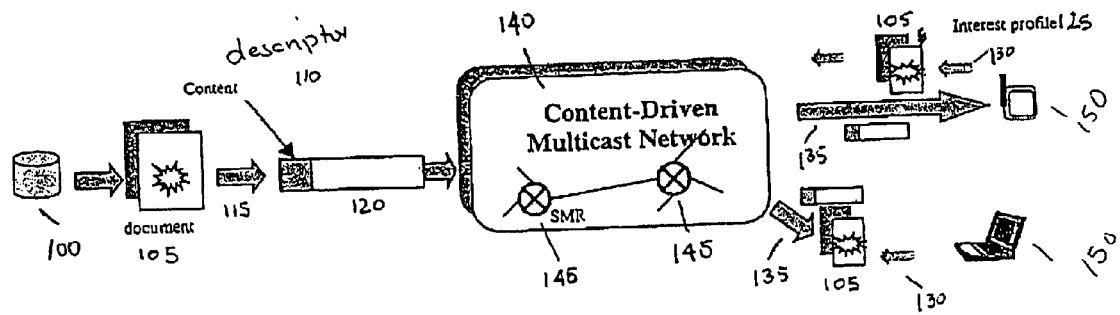
FIG. 1 illustrates an overview of a semantic multicast network of the present invention.

In the following detailed description, numerous specific details are set forth regarding the system and method of the present invention and the environment in which the system and method of the present invention may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. It should be understood that these examples are exemplary. It is contemplated that there are other methods and systems that are within the scope of the present invention. Also, the same reference numerals are used in the drawings and in the description to refer to the same elements to simplify the description.

The present invention is a dynamic content-driven multicast model based on a technique called "semantic routing". According to the present invention, network elements (access points, routers, and the like) route packets based on content descriptors, which are based on hierarchically organized ontologies or taxonomies, instead of a physical IP address, with the objective of directly delivering information based on content affinity between producers and consumers. This can be achieved by overlaying a content routing middleware framework on top of existing network layers to provide a so-called "semantic socket" layer service as an interface for development of a new class of mobile applications. Alternatively, a more integrated solution consists of a dual-stack router where IP routing and semantic routing co-exist.

Information providers "publish" their content by sending out packets to which a header has been attached which describes the content of the packet within a structured framework. In one embodiment of the present invention the headers are expressed in the eXtensible Markup Language (XML). In this embodiment, End-users "subscribe" by accessing the network with an XML "interest-profile". Alternatively, the interest profile is expressed using a language of the network community such as, for example, but not restricted to, Java or lisp, or a language familiar to the active networking community such as PLAN or Netscript.

Semantic routers aggregate interest profiles and exchange information with neighboring routers to create "content routing tables" that are used to forward packets flowing through the network. This content routing paradigm is inherently multicast-oriented, but unlike conventional IP multicast, the multicast tree is created dynamically on a packet-by-packet basis and involves no static channel mappings. Such a network is appropriate for logical services in which end-user's interest changes with time, location and information delivery needs are driven by content rather than a given physical addresses. For instance, interests which are sensitive to the physical location of the user will be a primary source of a changing profile. An example of a location-dependent interest could be a user's desire to purchase a given object in a particular price range. The 'long-distance' interest is in driving directions to a shopping mall that carries the item. Once inside the mall, the 'medium-range' interest is to provide a list of shops carrying the item, and their current prices, special offers, etc . . . After entering a shop, the 'short-range' interest is to locate the floor, aisle, etc where the merchandise is located. In this application, the user's 'interest'does not change, i.e., "coffee shops 5 miles around me," unless changed by the user but the information being delivered to match that need does. However, a user's profile may change. For example, if a user is driving in an automobile they may continually desire or have interest in finding "coffee shops 5 miles around me" however the "5 miles around me" will change as the user continues to drive and as such a user's profile will be updated with the new position information. In the case where the user is equipped with a Global Positioning System (GPS) receiver, the delivery mechanism could automatically adapt the level of information, by detecting that the user had entered a mall, or a specific shop within that mall. Alternatively, instead of using a user's GPS receiver to detect the location of a user the present invention can delegate to the Access Point Wireless Base Station the function of stamping the wireless content consumer's position. The granularity of a microcellular system could be ½ mile radius, sufficient to satisfy a Location Dependent Query (LDQ), such as for example, "coffee shops 5 miles around me."

The real-time requirement for mobile applications is met by the present invention because the network directly connects information producers and consumers without the latency of search engines as used in the web currently. Awareness of context and heterogeneity of information are supported by the network because an end-user can dynamically change interest profiles as a function of location, usage mode, and terminal capabilities. Terminal mobility is easier to handle at the application level because the network service is no longer point-to-point connection-oriented, and the session can resume after reattachment to a new access point simply by updating the user's profile (which includes the current physical location of the user). The content multicasting approach of the present invention is scalable because hierarchical XML profiles can be efficiently aggregated into a compact representation that is independent of the number of users. Content processing is distributed throughout the network, thereby eliminating the latencies and communication bottlenecks caused by centralized portals, mobile gateways, etc. In addition to scaling well, the content multicast approach of the present invention enables a new class of context-aware mobile applications (e.g., querying for local resources, content-driven instant messaging, etc.) in which information producers and consumers are dynamically linked by affinity of content and interest rather than by physical address.

I. Network Architecture

A semantic network of the present invention can be realized by a number of components, which will be articulated in the following sections.

A. Semantic Network:

The basic building block of the network is the Semantic Multicast Router (SMR) that routes data based on content descriptors rather than the IP (Internet Protocol) addresses currently used for routing over the Internet. Semantic routing provides a network infrastructure that directly links producers and consumers of information without having to go through the level of indirection associated with existing solutions such as search engines, directories, and content lists.

FIG. 1 is a diagram illustrating an example of an overview of a semantic multicast network of the present invention. Documents 105 are labeled with a content descriptor 110 and simply sent, at 115, into the network 140 by the producer 100. Such labeled documents are known as Semantic Packets (SP) 120. Information consumers express their interest, in the form of an interest profile 130, to the network 140 and receive, at 135, published documents 105 that match that interest. Describing a content consumer's interest is conceptually similar to formulating a query to an XML database. The network 140 that connects the producer 100 and consumer 150 is content-aware and is capable of efficiently delivering, at 135, information packets 120 to subscribers based on their interest profiles. The interest profiles of individual users are aggregated into a single interest profile representing the combined interests of all users connected to a particular router. The semantic multicast router (SMR) 145 forwards data based on the match between content descriptors 110 carried in the semantic packet 120 header and the aggregated interest profiles corresponding to each physical route. The range of usable descriptor language includes, for example, but not limited to, Standard Generalized Markup Language (SGML), or a subset of SGML such as XML. For example, the content descriptors 110 employed in one embodiment of the present invention are expressed in the resource descriptor framework (RDF) standardized by the WWW Consortium (W3C). RDFs are based on XML schemas and there currently exist hundreds of specific schemas proposed and standardized by various standards bodies and industry groups.

B. Semantic Network Interfaces & Protocols

Figure 2:
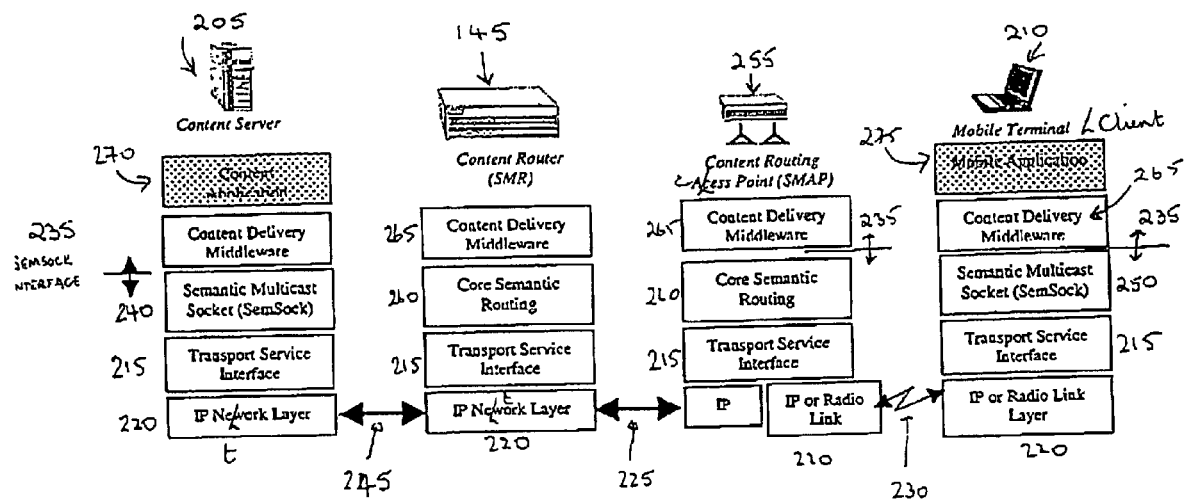
FIG. 2 illustrates an example of an end-to-end protocol architecture of a content multicasting mobile network of the present invention.

FIG. 2 illustrates an example of the architecture of the semantic multicast mobile network of the present invention. FIG. 2 illustrates a network that includes clients 210 and servers 205 with semantic network interfaces and semantic multicast routers which are connected to each other over appropriate transport and link layers. In general, these link layers use IP tunnels within the infrastructure network, or utilize radio link protocols for the last hop between access point and mobile terminal. Client and server applications interface with the semantic network through a software interface called SemSock™. On the server side, SemSock™ converts documents and their descriptors into well-formatted semantic packets and sends them to the assigned access router on top of an appropriate transport protocol referred to as SemLink™. Implementations of SemLink™ include multi-part HTTP, SOAP (Simple Object Access Protocol) over TCP. However, any link layer or tunnel protocol is suitable as long as it provides the right end-to-end semantics. Depending on the requirements of the information delivery service, the protocol may permit, or forbid, packet loss within the network. As the routers are completely stateless in regards to packet routing, losing a packet on a link has no impact on the proper function of the network. This is very similar to IP. IP is unreliable and any reliability properties (such as TCP) are provided by end-to-end protocols, according to the specific application requirements. In particular, most discussions on the issues inherent in reliable multicast (for example the phenomenon of "acknowledgement implosion") are directly applicable here.

On the client side, SemSock™ converts user interest profiles into resource profile (RP) messages which are sent to an assigned access router. Alternatively, the SemCast™ traffic is terminated at the access router. Arriving packets are either stored on the router and are accessible by the user through a web server. Alternatively, the packets are forwarded to an application or service via a different protocol. For example, a WebDAV adapter may be used to deliver the packets to a Web Storage Server, such as the Microsoft Exchange™ Mail Server. Gateways to other distributed system technologies, such as CORBA (Common Object Request Broker Architecture), DCOM (Distributed Component Object Model), or other Web-based Services can easily be realized. The SemSock™ API (Application Program Interface) runs at the access router, and clients can access the Semantic Network from a common browser. Access routers gather interest profiles and aggregate them into a content routing table used to make forwarding decisions on each data packet passing through the router. One embodiment of the present invention uses the XML query language under consideration by the W3C, augmented with a list of set and matching operators on the RD (resource descriptor) tree. RP messages are similar to routing messages that are periodically exchanged with all neighboring network nodes. According to another embodiment these protocols closely follow existing ones, notably IP multicast protocols.

The content multicasting functionality of the present invention can be implemented as an overlay on existing network infrastructures. Alternatively, the content multicasting functionality can be implemented as a more integrated solution consisting of a dual-stack router where IP routing and semantic routing co-exist. The network software required for content multicasting can be integrated into layer 3 routers and wireless access devices if desired. Alternatively, the network software runs on separate computing devices which are interconnected by IP tunnels. Under either embodiment, the content multicasting service (represented by the SemSock™ Semantic Multicast Socket, Core Semantic Routing, and Content Delivery Middleware modules in FIG. 2) can be classified as network-centric middleware that is used to add new service features to existing networks.

C. Core Semantic Routing

Figure 3:
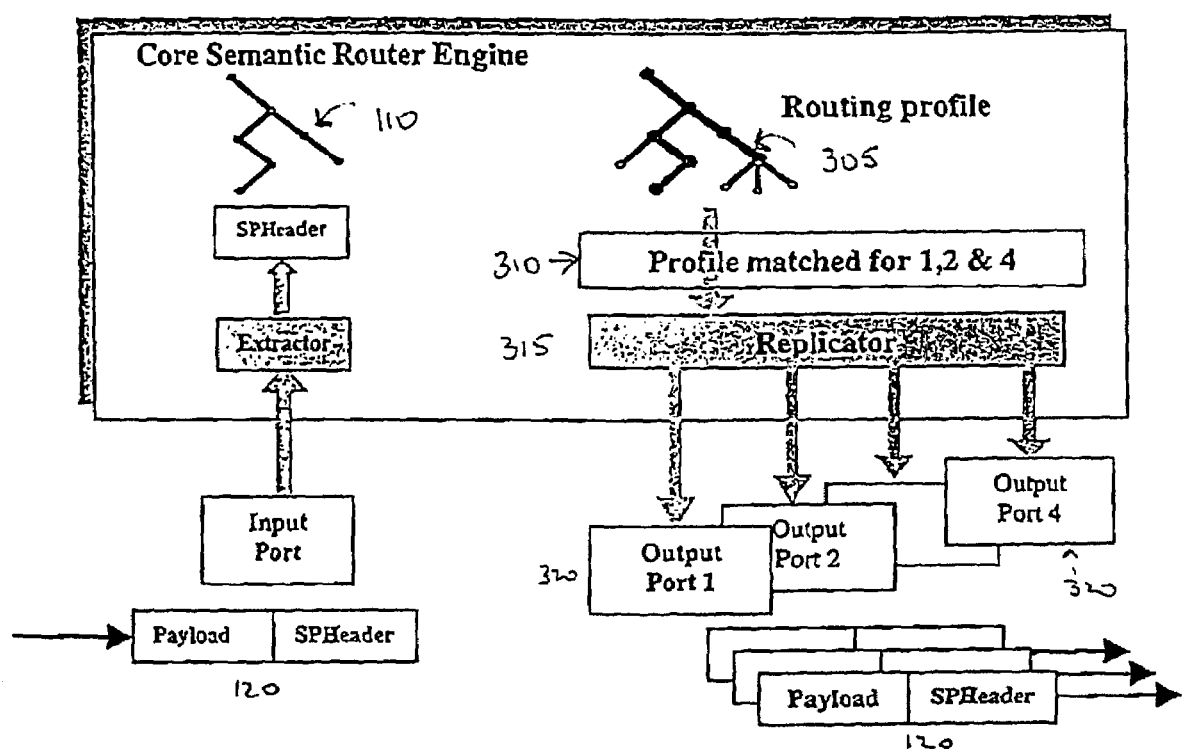
FIG. 3 illustrates an example of a content routing process based on tree-structured XML classifiers.

According to one embodiment of the present invention, the process of forwarding an incoming packet on one or more output ports of an SMR involves comparison of an incoming packet's XML content descriptor (CD) with the content routing structure held in resource profiles, representing aggregated interest profiles. Qualitatively the RP can be considered as a standing query which is applied to every incoming CD. If a particular CD passes the query associated with a particular port, a copy of the packet is forwarded to the link associated with that port. FIG. 3 illustrates an embodiment of the present invention where the routing decision qualitatively involves matching a tree-structured XML descriptor with the aggregated XML tree ("the routing table") that represents the RP's associated with a port.

D. Scalability of Content Routing

The routing decision of the present invention can be viewed as trying to map a tree (content descriptor) onto another (profile). Only if the mapping succeeds will the packet be forwarded on the port associated with the profile tree. The size of the trees are application specific. Generally, the content descriptor (CD), which is part of each packet, will not exceed a few hundred nodes. Most classification engines use less than 10,000 concepts arranged in fairly well balanced trees. Similar observations on size and structure are seen for various XML documents.

The mapping scales as a function of width and depth of the tree, with the number of nodes being an upper bound approximation to the complexity of the matching process. The complexity is bounded by the smaller tree as one tree is being mapped on the other node by node. As soon as one tree is exhausted, the mapping algorithm stops. Alternatively, each port is treated independently, in which case the upper bound on processing scales linearly with the number of ports. Alternatively, some semantic affinity between the profiles on a router exist, which means that part of the mapping decisions for one port, can be reused for another. Alternatively, the router profiles are combined into a single tree, thereby eliminating redundant comparisons.

Content Descriptors and interest profile trees effectively represent an ontology, which means that a parent element in the tree semantically "covers" the semantics of all possible children nodes. Thus, if the mapping process is truncated, so that not all nodes are examined, such a truncation will not incorrectly block any packets, but will instead let packets pass that should have been blocked. Letting packets pass that should have been blocked is known as information leakage. Leakage is defined as the fraction of packets which pass the semantic filters of the router ports even thought they should be blocked. Leakage increases both the communication load and the processing load on the downstream SMR, and provides a dynamic load balancing mechanism to trade off router computation against link bandwidth.

E. Profile Aggregation

Figure 4:
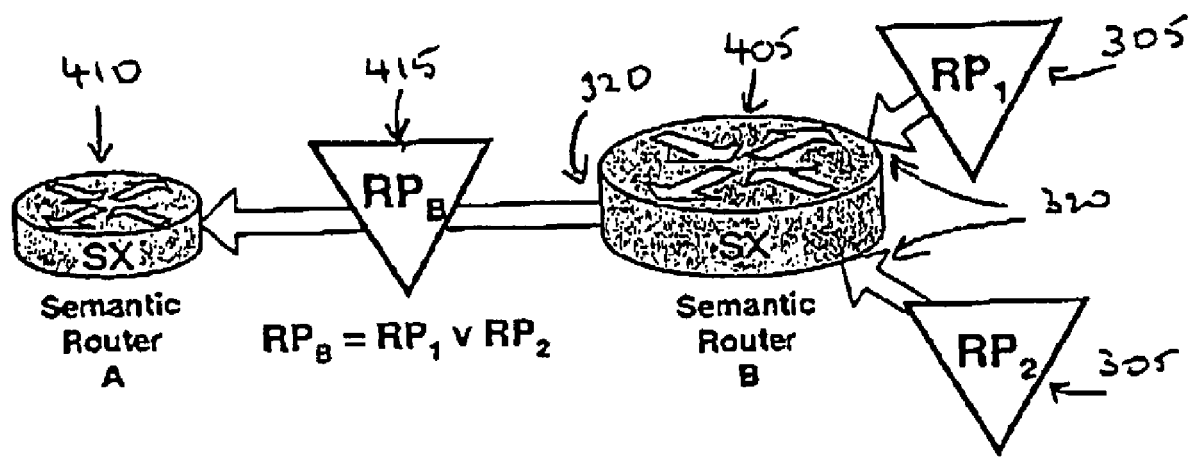
FIG. 4 illustrates an overview of an aggregation of router resource profiles.

FIG. 4 illustrates the distribution of RPs. Router B 405 has three ports. The routing protocol at router B 405 periodically sends $RP_B$ 415 to router A 410 that is the union of $RP_1$ and $RP_{2\ 305}$. In this way, each router maintains an aggregated set of resource profiles corresponding to its physical routes (ports) 320, and can update them when there are changes in either network topology or expressed interest.

An issue of special importance in the aggregation process is maintaining the balance between the amount of storage and processing used at a particular node and the amount of information leakage at each router port. In general terms, the more precisely the trees are matched (by considering more nodes in the tree), the more accurately the semantic packets will be filtered (reducing leakage), but the more rapidly the available storage and computation resources will be consumed. Alternatively, the crucial aggregation algorithm is decoupled from the rest of the router's implementation.

F. Semantic Multicast Example

For example, consider an application for announcing concerts. Table 1 shows a sample RD for an SP packet containing an HTML formatted announcement of a concert. Lines 2 & 3 are defining the semantic domain by introducing two XML namespaces. The "d" namespace and the associated "concert" domain attaches semantic meaning to the information in lines 5-14. These lines list the artist (line 5) performing in the concert, as well as the location (lines 7-10), time (lines 11-12), and the type of music (line 14). The payload (content or information) of this particular SP packet could be a nicely designed flyer that provides additional information and incentives to buy a ticket for this particular event. To receive this packet, a user would have sent an interest profile into the network. One example of the format of an interest profile can take is modeled after XML-QL. Alternatively, an augmented RDF is used for the interest profile format. In the RDF format a "standing query" is used to determine if a semantic packet should be forwarded or not.

TABLE 1

Example of resource descriptor

| | |
|---|---|
| 1: | <rdf:RDF |
| 2: | xmlns:rdf = "http://www.w3.org/TR/WD-rdf-syntax#" |
| 3: | xmlns:d = "http://schema.concerts.org/concert/1.0" |
| 4: | <rdf:Description> |
| 5: | <d:Artist>Joe Doe</d:Artist> |
| 6: | <d:Locale> |
| 7: | <d:Venue>Concert Hall</d:Venue> |
| 8: | <d:Position latitude="40.48640" |
| 9: | longitude="-74.4"/> |
| 10: | <d:City>New Brunswick</d:City> |
| 11: | <d:Date>7/4/2000<d:Date> |
| 12: | <d:Time>8pm</d:Time> |
| 13: | </d:Locale> |
| 14: | <d:Genre>Jazz</d:Genre> |
| 15: | </rdf:Description> |
| 16: | </rdf:RDF> |

Table 2 shows a sample profile of one embodiment of the present invention that would "attract" the SP packet from Table 1. Line 2 introduces the RP name space, and line 3, the particular semantic domain. Lines 5-10 limit the venue to a radius of 10 miles from a specific location (line 8). In addition, lines 11-16 indicate that the user is only interested in two types of music. This particular format defines a logical "AND" (line 4) relationship between the two restrictions. Both must be true for the packet to be allowed through. In line 7, the receiver has limited the distance he or she is willing to travel. A GPS receiver can supply the latitude and longitude attributes. Mobile devices could periodically update their RP with their current location and therefore, provide an efficient infrastructure for location aware information services.

TABLE 2

Sample interest profile

| | |
|---|---|
| 1: | <ri:RI |
| 2: | xmlns:ri = "http://schema.semandex.net/ri/1.0" |
| 3: | xmlns:d = "http://schema.semandex.net/concert/1.0" |
| 4: | <ri:And> |
| 5. | <d:Locale> |
| 6: | <d:Position> |
| 7: | <ri:distance within="10" units="mi"> |
| 8: | latitude="40" longitude="-74.4"/> |
| 9: | </d:Position> |
| 10: | </d:Locale> |

TABLE 2-continued

Sample interest profile

```
11:         <d:Genre>
12:             <ri:Or>
13:                 <ri:string-match>Jazz</ri:string-match>
14:                 <ri:string-match>Rock</ri:string-match>
15:             </ri:Or>
16:         </d:Genre>
17:     </ri:And>
18: </ri:RI>
```

G. Mobility Support in the Semantic Network

When a mobile user changes his or her point of attachment (e.g., mobile cell) from one access point to another, the design of the content multicast network of the present invention faces a user re-registration and service handoff problem analogous to that in most wireless networks. The difference between current wireless networks and the present invention is that the content network service of the present invention is a logical multicast information service rather than a point-to-point transport connection. It is generally understood that multicasting simplifies service handoff because the existence of the same information at neighboring access points makes it easier for the mobile device to reconnect. In the present invention, a migrating user needs to initiate an interest profile update message when it establishes contact with a new access point. Logically, this is no different from updating the interest profile due to changing information needs rather than location, and thus requires no new protocol support. After each move, there may be some time needed to propagate the interest profile through the new access point and routers to which it is connected, thus creating some latency. This latency will be eliminated in those cases where the information is already being requested by other users connected to the new access point, since the aggregated interest profiles for the new access point will already be "attracting" the information. Especially in the case of location-dependent information, the natural information affinity effect means that seamless operation of the application will generally continue after a move. The present invention thus implements a form of virtual caching.

Alternatively, in cases where a dynamic "handoff" with low latency is desired, it is also possible to augment the routing protocol to notify the new access point of the subscriber's interest profile in advance of the handoff, based on radio link level information. A mechanism for authenticating the wireless user at the new access point is required. Since the packets are delivered directly through the new access point, there is no requirement for "store-and-forward" services or a "path-extension" protocol at the old access point, unlike other mobility solutions. With such SMR-level handoff, the network does not need to provide additional mobility support permitting the use of a simpler radio network layer to the wireless device. Since an SMR access point has relatively fine-grained knowledge of the interest for users in a given coverage area, it can use that information to support local cache or data broadcasting services which are updated based on aggregated interest profiles available from an SMR or SMAP. Alternatively, the present invention operates without local caching.

Another aspect of the present invention is the Quality-of-Service (QoS) associated with the network service under consideration. The concept of QoS is different for the present invention's networking model, since the traditional bandwidth-based or delay-based end-to-end QoS model for point-to-point services over the Internet does not apply. The QoS in the present invention is defined in terms of parameters such as information scope or volume and delivery latency as a function of overall network loading. A higher quality-of-service corresponds to quick access to a broader range of information. During congested periods, the semantic network limits the scope of information requests from an end-user during network access (i.e., updating or initializing a user profile). In addition, once the request has been accepted, it is possible to differentiate the content delivery service based on user class (e.g. gold, silver, bronze) in terms of router processing and output link queuing.

Figure 5:
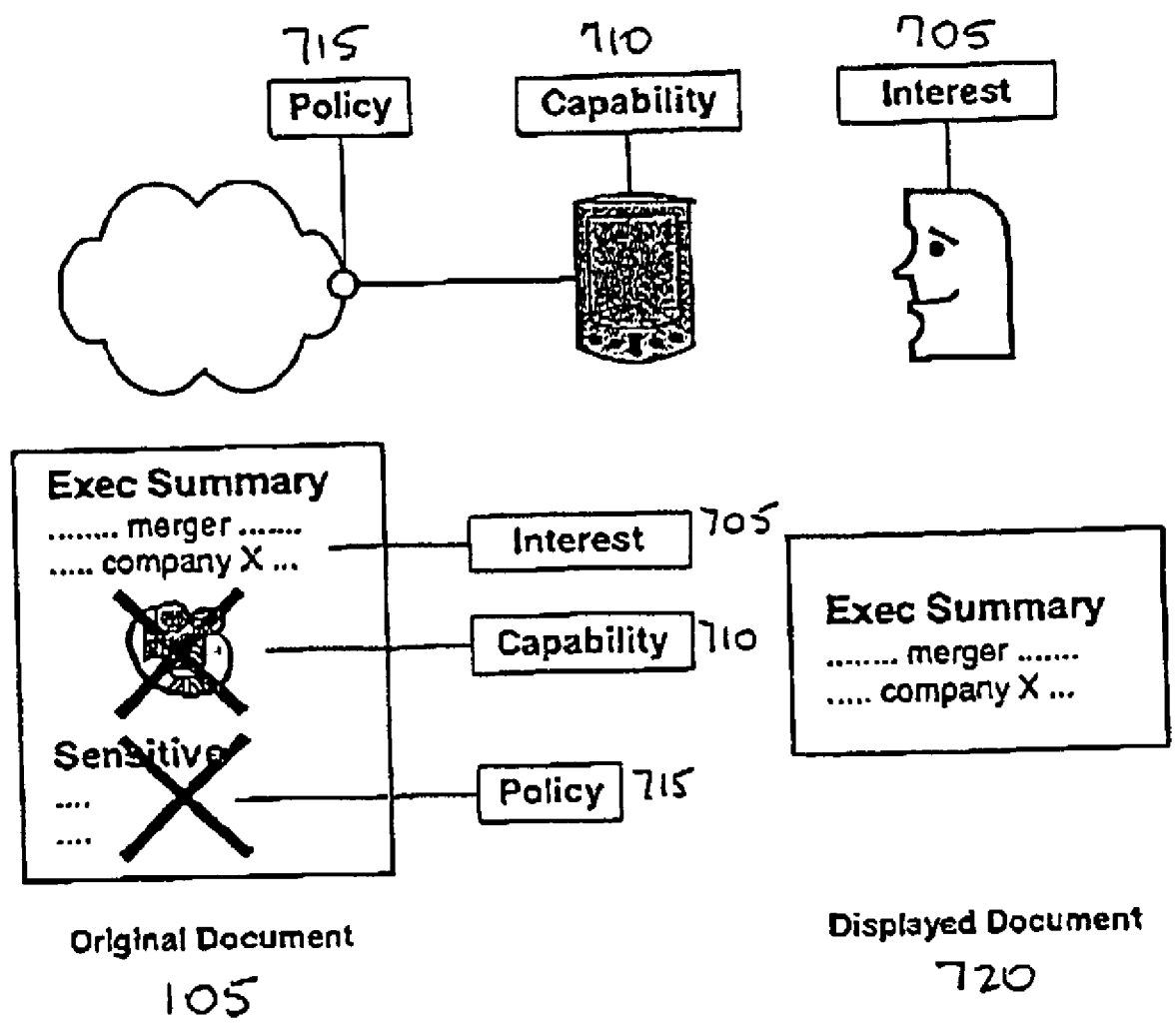
FIG. 5 illustrates an example of selective routing decision making based on content and semantic profiles.

Alternatively, having a much richer header will also allow the router to make more intelligent decisions on what to forward and in which order during times of congestion. If the document carried in the packet is semantically well structured (e.g., expressed in XML) even partial delivery is possible. For instance, an access router may only forward the "executive summary" portion of a document. This is accomplished by setting multiple profiles with each port as shown in FIG. 5. Profiles used include "user interest" 705, "policy" 715, and "capability" 710. The user interest profile 705 is created by the end-user applications. The policy profile 715 can be set by the network operator to restrict the material received by the user based on content. The policy profile 715 can be used to enforce information access control (e.g., security), but can also be used for content filtering (e.g., blocking pornography). The "capability" profile 710 represents both the capabilities of the terminal and the capabilities of the link connecting the terminal to the network. For instance, high-resolution images cannot be displayed properly on a PDA with a small screen and limited CPU and memory resources. Instead of delivering such an image to the PDA, where it will be discarded, the image 105 can be blocked 720 earlier within the network. It is also possible to use the capabilities profile 710 in conjunction with media gateway functionality allowing content to be dynamically transformed to fit the capabilities of the receiving device.

II. Content Multicast Network Middleware

The content multicast network of the present invention includes, but not by way of limitation, the following software components:

Semantic multicast router software

Semantic multicast service API (Semsock™) at client/server

Network management and configuration interface for initial network setup, resource provisioning, reporting of alarms, performance, etc.

Add-on service feature modules, e.g. content classifier, mobility support, QoS manager, etc. for client and server Add-on router modules for programmable special services, e.g., RP aggregator, signaling interface, mobility support, QoS algorithms, privacy and security, etc.

A. Semantic Multicast Router Software:

One approach adopted in the present invention is similar to the spirit of "programmable networks", which provide an open interface to the core router through which new functional modules can be added dynamically. Most notable is the Mobiware project at Columbia University which provides a CORBA interface for all locally available resources. Mobiware is a software-intensive adaptive mobile networking environment based on distributed object technology. Mobiware consists of an active transport environment, a programmable mobile network, and a programmable Medium Access Control (MAC) layer. Access is provided to both the data and control planes in order to permit functions that go beyond simple routing. Such functions include transformation of payload data dynamically to adapt to the capabilities of the end-user's terminal. An example of such an architecture, and expressly incorporated herein by reference, is found in the JOURNEY Active Network Model as described in "Max Ott, Girish Welling, Saurabh Mathur, Dan Reininger, Rauf Izmailov, 'The JOURNEY Active Network Model,' WEEE JSAC, vol. 19 no. 3, pp. 527-537". One embodiment of the present invention implements the core SMR using the Java programming language. The control plane is accessible through an remote management interface to the RouterManager.

Figure 6:
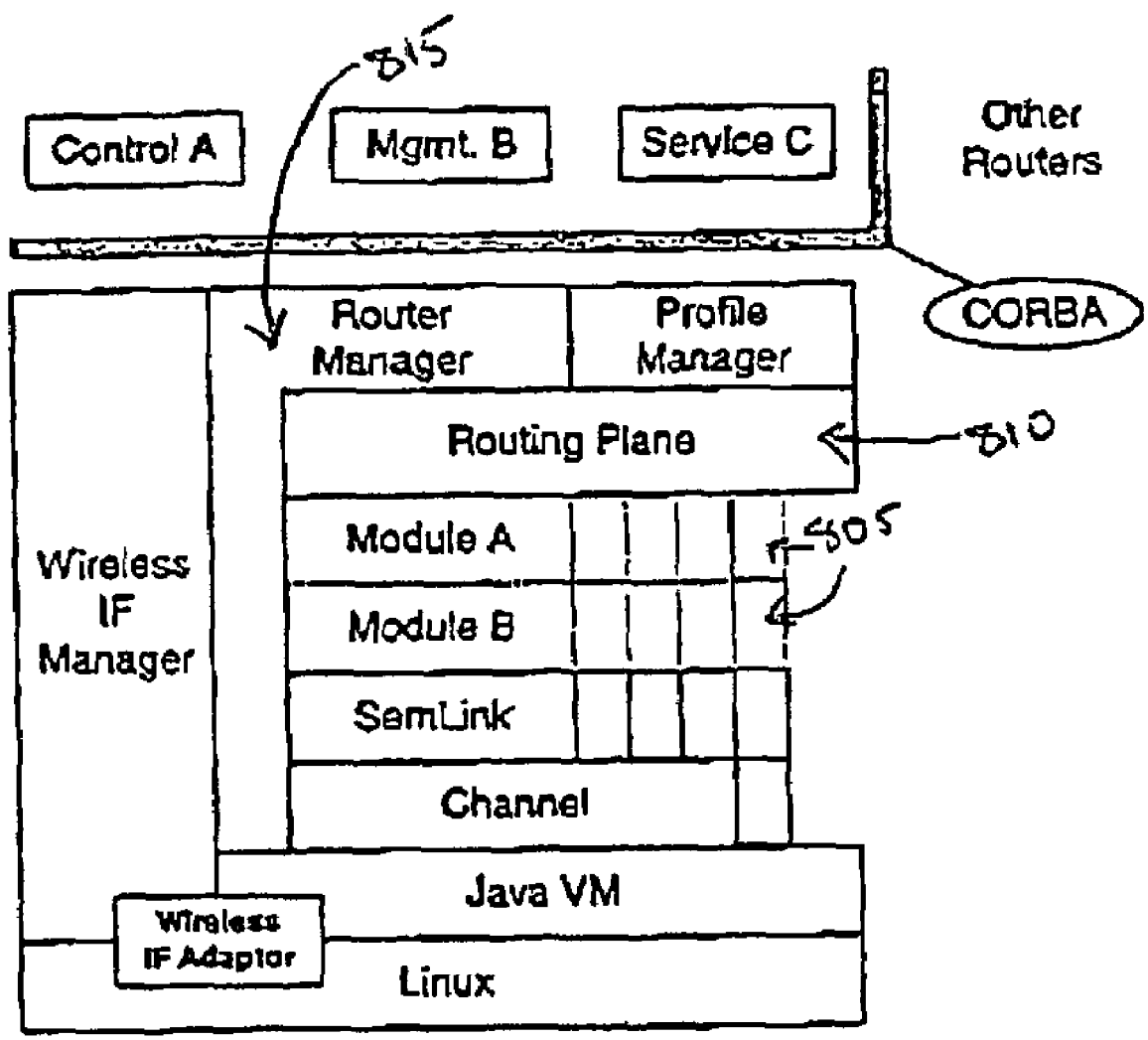
FIG. 6 illustrates an example of a software architecture of the semantic multicast router and access point.

One aspect of the architecture design of the present invention is its ability to dynamically add payload processing capabilities. Unlike extensions to the control plane, any processing in the data plane needs to be tightly integrated. For practical purposes, this means that the extensions need to be loaded on the routing device itself, ideally in the same address space to minimize data copying overhead. FIG. 6 is an illustration exemplifying an example of an architecture of the present invention. This design is similar to the BSD UNIX™ System V streams module. Messages (or packets) flow through a stack of modules with identical data-passing interfaces. Each module receives a stream of messages from an adjacent (upper or lower) module and can then elect to process them before handing it to the corresponding (lower or upper, respectively) module. The control plane assembles or modifies the stack. In the case of the SMR, the top-level module is connected to the routing plane which turns an incoming message from one port into a outgoing message for all selected ports. The lowest module, in turn, provides the interface to the link. For a physical link, the lowest module is the device driver for the network device, while for an overlay link the lowest module is the tunnel end-point.

As previously mentioned, in the current embodiment the SMR is coded in Java and the RouterManager interface provides for a mechanism to dynamically load an external module and insert it into an existing stack. According to an alternative embodiment, support is provided for remote deployment of new modules through the network administration infrastructure. The core SMR (or SMAP) used in one of the embodiments of the present invention is based on a software-only solution optimized for a standard multi-processor Linux kernel, which permits support to be added for various wireless interfaces and protocols, including sensors.

B. Service API at Client and Server (Semsock)

Figure 7:
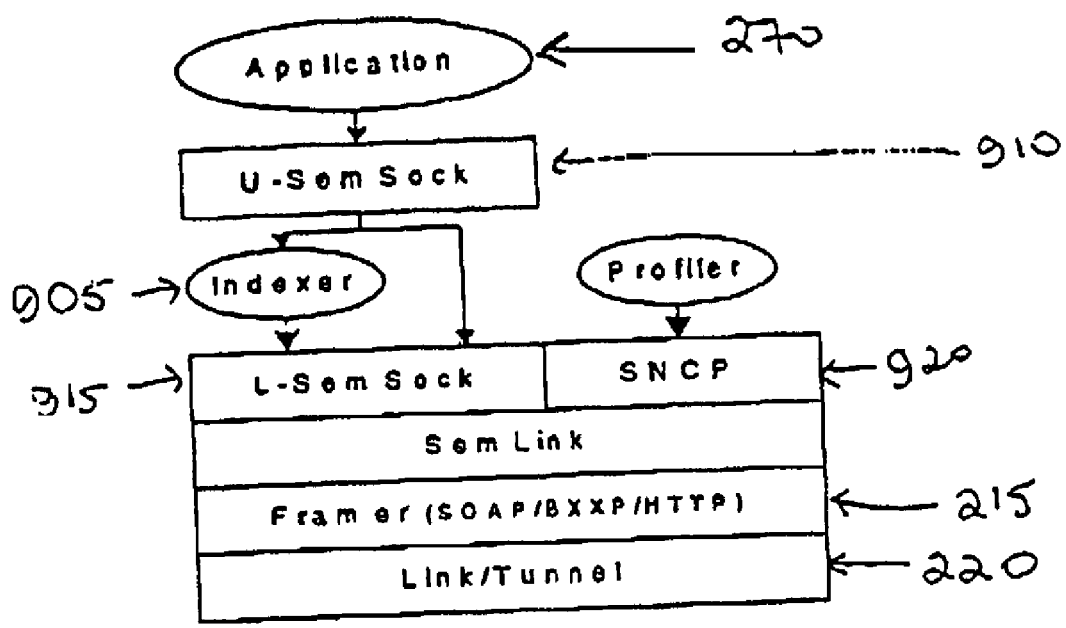
FIG. 7 illustrates an example of a SemLink™ protocol stack.

Similar to the familiar socket interface for IP networks, an application-programming interface to a semantic network is defined. However, the API of the present invention is different from current socket-based networks in that each packet is not associated with a receiver address, but is tagged with XML encoded meta-data. For certain application classes, the meta-data is created dynamically by an Indexer. According to another embodiment of the present invention the API is realized as a two-layer (upper and lower) structure to allow the choice of the indexer to be decoupled from the application specific code. FIG. 7 is a block diagram illustrating how the upper U-SemSock™ API allows an application to send data without meta-data. An adaptor calls upon a dynamically selectable indexer to extract the necessary information from the payload and to construct the meta information, for example as an XML tree as shown in Table 1. The lower L-SemSock™ API defines the interface for sending a payload together with the meta-data into a semantic network. According to one embodiment of the present invention, SOAP/HTTP is used for the framing protocol. According to another embodiment of the present invention, the BEEP protocol is used. BEEP is the Blocks Extensible Exchange Program, an industry-standard proposal that can be referenced at www.bxxp.org. According to another embodiment of the present invention, a proprietary protocol is used.

Another component in a semantic network is the interest profile of a terminal. This profile is the combination of the profiles provided by all applications activated on a terminal. The profile of an application can at one extreme be fixed at design time, or at the other, be dynamically created at run-time through user direct input, or an adaptive process driven by observations, feedback, or other application specific means. The Semantic Network Control Protocol (SNCP) module is responsible for forwarding any changes in the profile to the access server. To maintain robustness and reliability with the semantic network, no state information is permanently associated with any router port or link. In order to maintain this "soft-state," profiles must be re-sent into the network periodically, even if they remain unchanged.

C. Network Configuration and Management

The open-interface router architecture outlined earlier lends itself to building network management applications on the same RouterManager API used for services. Alternatively the present invention includes, for example, basic capabilities for configuring the network from a workstation, and for network management screens that report on alarms, and performance.

Figure 8:
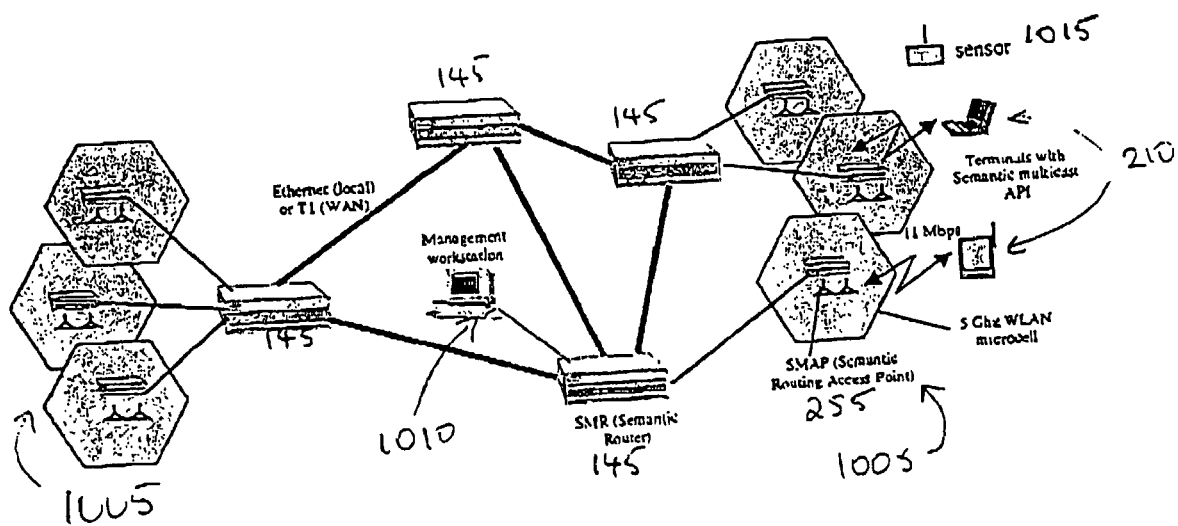
FIG. 8 illustrates an example of a hardware architecture of a content multicast mobile network of the present invention.

FIG. 8 depicts an exemplar of an operating environment of the present invention consisting of a semantic routing infrastructure (implemented as on overlay on IP tunnels) of 4 SMR routers 145 connecting two wireless access clusters 1005, each containing 3 SMAR access points 255. The semantic routers 145 and access points 255 are based on off-the-shelf hardware with appropriate network interfaces. In particular, the SMR router 145 platform uses a rack-mounted dual Pentium PC processor running a Linux OS, which leverages open-source IP implementations as the networking base. The routers are connected via a 100 Mbps Ethernet switch. Alternatively the routers are connected via T1 WAN interfaces. The SMAP access point 255 uses an 11 Mbps/2.4 GHz or 5 GHz IEEE 802.11 wireless LAN (WLAN) unit connected to the same type of Linux PC as the router. Each wireless cluster 1005 consists of 3 WLAN access points operating on independent frequencies to support a cellular service with terminals 210 moving from one access point (AP) to another. Multicast routing middleware is implemented on the above platforms using the content routing software of the present invention, with extensions made to cover, including but not by way of limitation, mobility, QoS, and caching. Configuration and management software (accessed through a management workstation) 1010 is implemented to facilitate setup and operation of the system, along with observation of network performance metrics. FIG. 8 shows an example of the hardware architecture of a content multicast mobile network of the present invention.

III. Sensor Networks: An Application

An exemplary application for the present invention is a sensor network. Attaching a large number of sensors to a conventional IP network is very complex. Besides managing the addressing scheme for a potentially large and dynamic set of components, multiple layers of higher layer protocols for binding and distribution need to be supported by the sensor. Under such a system many of the capabilities of those layers will not be used. Ideally, the sensors should be as simple as possible with complexity shifted to the processing nodes. In the present invention, sensors only need to send their measurements into the network. There is no need for binding to one or multiple delivery endpoints. Using XML creates self-describing data items which can be injected into the network on top of simple MAC layers. This is especially valuable for wireless applications where the sensor, CPU (for calibration, control, and formatting), and radio (e.g., pico radio) must be combined on a single chip for cost reasons. Simplifying the processing requirements on the sensor will also lower the energy consumption and increases battery life for mobile devices.

As the sensors simply send their data into a semantic network, rather than delivering them to a single endpoint, applications which process these readings can be added at any time without reconfiguring central directories, gateways, or other conventional distribution mechanisms. In contrast, implementing such a system using IP multicast is only rarely the right solution. Attaching sensors to IP multicast addresses reduces the flexibility of the application space considerably. While one application may be interested in all of a sensor's reading, another one may only be interested in readings if the sensor is in a particular area, and certain parameters are within a certain range. Creating a channel scheme for such complex, but very real scenarios, will not only increase the complexity of the sensor, but will also quickly lead to a state explosion.

An example of a sensor network is a wireless monitoring system with a mixture of light or motion sensors (constantly vigilant at low-power), and higher-power and higher-bandwidth sensors such as microphones or cameras. To conserve energy and bandwidth the audio-video sensors could be off (or not recording) at most times, except when triggered by less expensive light sensors. A wireless content consumer can issue queries or subscribe to sensor data from the sensor network with specific attributes and will receive such data from whatever relevant sensors respond.

According to this example, access nodes receive data from sensors connected to that access point and label that data with attributes, such as sensor position, sensor activity, and the like. Sensor nodes do not need to have a globally unique identifier or globally unique addresses. Consider an application on a wireless terminal connected via a radio link to a network implementing content-based multicast routing as per this invention. Consider next a content consumer that uses the application to issue queries for audio-visual activity within a given distance from where the terminal is located, as the content consumer moves. Queries are labeled with sensor type, i.e., audio-visual or light, known to the application at design time. Queries propagate through the content-based network to be handled by network access nodes attached to matching sensors in the relevant geographic region. Moreover, the decision of one sensor triggering another can be moved into the content-based network to be handled directly between the light and audio sensors. Traditional network architectures have a central directory of active sensors and a central application that interrogates this database, monitors specific sensors, and then triggers others. Content-based multicast routing as implemented in the current invention eliminates the communication costs of maintaining the central information and provides a more robust and long-lived network in spite of changing communications, moving content consumers, and limited battery power.

Although the invention has been described and illustrated in the foregoing exemplary embodiments, it is understood that the present disclosure has been made only by way of example, and that numerous changes in the details of construction and combination and arrangement of processes and equipment may be made without departing from the spirit and scope of the disclosed invention.

What is claimed is:

1. A method for routing content through a network based on its content from at least one content provider to at least one content consumer, wherein the at least one content consumer using a wireless device is in wireless communication with the network via at least one of a plurality of access points, said method comprising:
    receiving an interest profile for a content consumer each time the content consumer establishes contact with the network via one of the plurality of access points, the interest profile includes information that identifies a content consumer's interest in receiving content;
    aggregating the received interest profile with interest profiles of other content consumers each time an interest profile is received from the content consumer;
    exchanging said aggregated interest profiles with neighboring network nodes;
    receiving a semantic packet wherein the semantic packet includes content and at least one content descriptor; and
    forwarding said content to said content consumer based on at least a comparison between the at least one content descriptor included in the semantic packet and said received interest profile from said content consumer.

2. The method according to claim 1 further comprising receiving the interest profile from the content consumer in an interest profile update message, wherein said interest profile update message comprises information based on the geographic location of the wireless device.

3. The method according to claim 2 further comprising determining when to transfer a wireless content consumer's interest profile to a new one of the plurality of access points within the network, wherein said determination is based on radio link level information received at the current one of the plurality of access points from the wireless device.

4. The method according to claim 3, further comprising delivering content to the content consumer's wireless device from the new one of the plurality of access points to the network.

5. The method according to claim 1, further comprising creating a content routing table, wherein said content routing table is capable of routing said content through the network and wherein said content routing table is created dynamically based on the aggregated interest profiles.

6. The method according to claim 5, wherein forwarding said content and said at least one content descriptor to a wireless device comprises comparing incoming content and said at least one content descriptor with the content routing table.

7. The method according to claim 5, wherein the step of aggregating said interest profile from said content consumer and creating the routing table is distributed throughout the network.

8. The method according to claim 1, wherein said interest profile is expressed in the XML programming language.

9. The method according to claim 8, wherein said interest profile is aggregated with said at least one additional interest profile into a compact representation.

10. The method according to claim 1, further comprising receiving a capacity profile wherein said capacity profile represents both the capacity of the wireless device and the capacity of a link connecting the wireless device to the network.

11. The method according to claim 10, further comprising using information contained in the capacity profile to dynamically transform content to fit the capabilities of the wireless device.

12. The method according to claim 1, wherein said interest profile changes as a function of at least one of geographic location of the wireless device, usage mode of the wireless device, the wireless device capacity, or combinations thereof.

13. The method according to claim 12, wherein said interest profile changes are detected by the one of the plurality of access points of at least one of said content consumer or content provider to the network, wherein the one of the plurality of access points changes the interest profile based on at least said detected changes.

14. The method according to claim 1, wherein said content is sensor content from a wireless sensor network and said at least one content descriptor is at least one attribute of a sensor device in said wireless sensor network.

15. The method according to claim 14, wherein said interest profile from said content consumer comprises at least one query of said wireless sensor network.

16. The method according to claim 1, wherein said content descriptor is selected from at least one of hierarchically organized ontologies or hierarchically organized taxonomies.

17. The method according to claim 1, wherein said content descriptor is expressed in the XML programming language.

18. The method according to claim 1, wherein said step of generating a single interest profile balances the amount of storage and processing used at a each network node and the amount of information leakage at each network node by controlling the degree to which content descriptors and interest profiles match.

19. The method according to claim 1, further comprising receiving a policy profile wherein said policy profile restricts the type of content that can be received by said content consumer's wireless device independent of the content consumer's interest profile.

20. The method according to claim 1, further comprising receiving a policy profile wherein said policy profile comprises information to dynamically transform content to fit at least one dissemination policy of said content consumer.

21. The method according to claim 1, further comprising limiting the scope of queries from the content consumer based on the congestion level of the network.

22. The method according to claim 1, further comprising prioritizing content delivery to the content consumer based on a class assignment associated with said content consumer.

23. The method according to claim 1, further comprising prioritizing content delivery to said content consumer based on environmental parameters and system resources including at least one of content consumer access modality, cognitive posture, wireless bandwidth availability or terminal information processing load.

24. A system for routing content through a network based on content from at least one content provider to at least one content consumer, wherein the at least one content consumer using a wireless device is in wireless communication with the network, the system comprising:
at least one content server, wherein said at least one content server is capable of providing content and at least one content descriptor, wherein said content is labeled with said at least one content descriptor, and wherein said at least one content descriptor is capable of describing the content available from the content provider;
a plurality of content routers wherein at least one of the plurality of content routers transmits the content labeled with the at least one content descriptor into the network;
a plurality of access routers, wherein at least one content consumer is associated with at least one of said plurality of access routers through a wireless link, said at least one of said plurality of access routers receives an interest profile for a content consumer each time the content consumer establishes contact with the network via one of the plurality of access routers the interest profile includes information that identifies a content consumer's interest in receiving content, aggregates the received interest profile with interest profiles of other content consumers each time an interest profile is received from the content consumer, exchanges said aggregated interest profiles with neighboring access routers, receives a semantic packet wherein the semantic packet includes content and at least one content descriptor and forwards said content to said content consumer based on at least a comparison between the at least one content descriptor included in the semantic packet and said received interest profile from said content consumer.

25. The system according to claim 24, wherein each of said plurality of access routers is capable of supporting at least one of local cache services or data broadcasting services based on aggregated interest profiles stored at each of said plurality of access routers.

26. A computer readable medium for storing computer executable instructions for routing content through a network based on its content from at least one content provider to at least one content consumer, wherein the at least one content consumer using a wireless device is in wireless communication with the network via at least one of a plurality of access points, said executable instructions comprising:
receiving an interest profile for a content consumer each time the content consumer establishes contact with the network via one of the plurality of access points, the interest profile includes information that identifies a content consumer's interest in receiving content;
aggregating the received interest profile with interest profiles of other content consumers each time an interest profile is received from the content consumer;
exchanging said aggregated interest profiles with neighboring network nodes;
receiving a semantic packet wherein the semantic packet includes content and at least one content descriptor; and
forwarding said content to said content consumer based on at least a comparison between the at least one content descriptor included in the semantic packet and said received interest profile from said content consumer.

27. The system according to claim 24, wherein the plurality of content routers comprises a plurality of dual-stack routers, wherein said plurality of dual-stack routers are capable of both content routing and IP address routing.

28. A system for routing content from at least one content provider through an IP network to at least one content consumer's wireless device, wherein said content is routed through the IP network based on content descriptors associated with said content and wherein at least one of said content consumer using a wireless device is in wireless communication with the network, said system comprising:

an IP network;

at least one content server in communication with said IP network, wherein said at least one content server is capable of providing content and at least one content descriptor, wherein said content is labeled with said at least one content descriptor, and wherein said at least one content descriptor is capable of describing the content available from the content provider and wherein said at least one content server comprises:
a content delivery middleware,
a content multicast socket, and
a transport service interface;

a plurality of content routers in communication with said IP network, wherein at least one of the plurality of content routers transmits the content wherein said content is labeled with the at least one content descriptor into the IP network and wherein said each of said plurality of content routers comprises:
a content delivery middleware, and
a transport service interface;
a wireless link;

a plurality of access routers in communication with said IP network and a wireless link, wherein at least one content consumer is associated with at least one of said plurality of access routers through a wireless link, said at least one of said plurality of access routers receives an interest profile for a content consumer each time the content consumer establishes contact with the network via one of the plurality of access routers, the interest profile includes information that identifies a content consumer's interest in receiving content, aggregates the received interest profile with interest profiles of other content consumers each time an interest profile is received from the content consumer, exchanges said aggregated interest profiles with neighboring access routers, receives a semantic packet wherein the semantic packet includes content and at least one content descriptor and forwards said content to said content consumer based on at least a comparison between the at least one content descriptor included in the semantic packet and said received interest profile from said content consumer, said plurality of access routers comprising;
a content delivery middleware, and
a transport service interface;

at least one wireless terminal in communication with said a wireless link, said wireless terminal comprising:
a content delivery middleware,
a content multicast socket, and
a transport service interface.

29. An access router for routing content through a network based on its content from at least one content provider to at least one content consumer, wherein the at least one content consumer using a wireless device is in wireless communication with the network via at least one of a plurality of access points, said access router comprising:

means for receiving an interest profile for a content consumer each time the content consumer establishes contact with the network via one of the plurality of access points, the interest profile includes information that identifies a content consumer's interest in receiving content;

means for aggregating the received interest profile with interest profiles of other content consumers each time an interest profile is received from the content consumer;

means for exchanging said aggregated interest profiles with neighboring network nodes;

means for receiving a semantic packet wherein the semantic packet includes content and at least one content descriptor; and means for forwarding said content to said content consumer based on at least a comparison between the at least one content descriptor included in the semantic packet and said received interest profile from said content consumer.

* * * * *